UNITED STATES PATENT OFFICE.

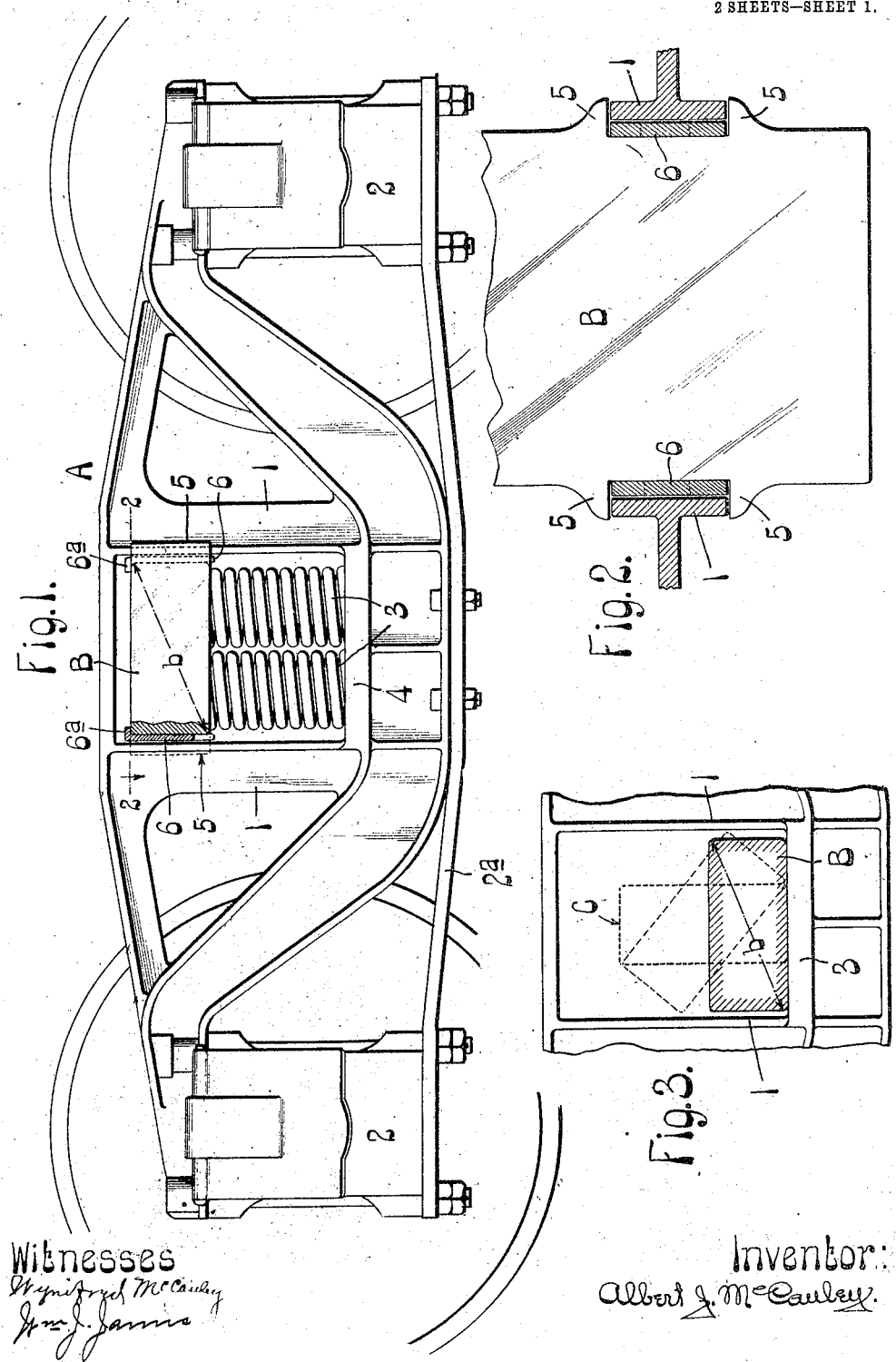

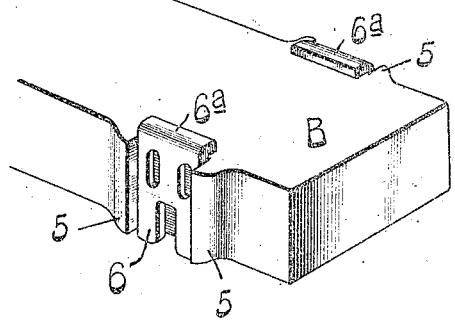
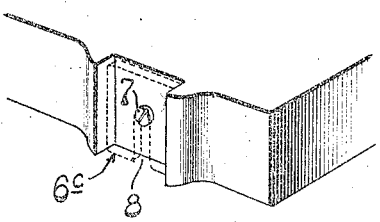
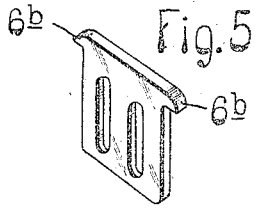
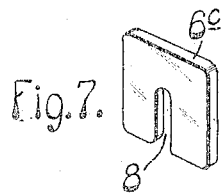
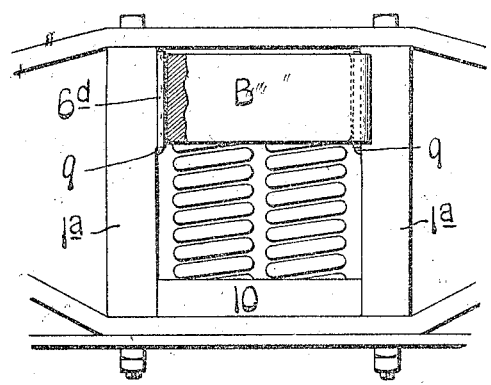

ALBERT J. McCAULEY, OF ST. LOUIS, MISSOURI, ASSIGNOR TO AMERICAN STEEL FOUNDRIES, OF CHICAGO, ILLINOIS, A CORPORATION OF NEW JERSEY.

CAR-TRUCK.

944,202.   Specification of Letters Patent.   Patented Dec. 21, 1909.

Application filed February 1, 1909. Serial No. 475,461.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a side elevational view, partly in section, of a car truck embodying the features of my invention; Fig. 2 is an enlarged horizontal sectional view taken on the line 2—2 of Fig. 1; Fig. 3 is a diagrammatical view illustrating various positions occupied by the bolster while it is being removed from the truck; Fig. 4 is a perspective view of a portion of the bolster and filler block shown in Fig. 1 and Fig. 2; Fig. 5 illustrates a modified form of the filler blocks shown in Fig. 4; Fig. 6 is a perspective view of a modified form of bolster; Fig. 7 is a detail view of a filler block used in connection with the bolster shown in Fig. 6; and Fig. 8 is a side elevational view of a modified form of the truck shown in Fig. 1.

This invention relates to improvements in car trucks, the main object being to provide a car truck in which the bolster can be easily removed from the truck side frames.

In the drawings A indicates a truck side frame provided with columns 1, the ends of said frame being mounted on journal boxes 2. 2ª indicates a tie bar arranged under the side frame and connected to the journal boxes. A bolster B extends through an opening in the truck side A and rests on springs 3, the latter being supported by a spring seat 4 formed integral with the truck side. The usual column guides 5, which are preferably formed integral with the bolster, coöperate with columns 1 and prevent the bolster from shifting longitudinally.

The end portions of the bolster which are located between columns 1 are preferably rectangular in cross section, the distance across said rectangular portion measured on the diagonal line $b$ being less than the distance between columns. To obtain these relative dimensions, the bolster must be normally spaced a certain distance away from the columns and means must be provided for locking the bolster against rotation and preventing it from shifting laterally when in service. Removable filler blocks 6 are interposed between the bolster and columns, each of said blocks being preferably provided with a supporting flange 6ª which rests on the bolster. These blocks 6 are simply filler pieces, the only shocks they receive in service being in the form of compressive stresses caused by the bolster shifting toward the columns.

In removing the bolster from the truck the first step is to remove springs 3, this allowing the bolster and filler blocks to fall on the spring seat, and the filler blocks are then lifted out of the space between the bolster and columns. After the springs and filler blocks have been removed from the truck, the bolster is turned as shown by dotted lines in Fig. 3 to the position indicated at C, and when the bolster is in this latter position it can be moved longitudinally through the opening in the truck side frame, as the column guides are then out of alinement with the columns.

Fig. 5 illustrates a modified form of filler block having supporting lugs 6ᵇ which are adapted to rest on the column guides of a bolster.

In the modified form shown in Fig. 6 and Fig. 7 the filler block 6ᶜ is supported by a lug 7 which is secured to the bolster, said lug being normally located in a recess 8 formed in the filler block 6ᶜ.

Fig. 8 illustrates an ordinary arch bar or diamond frame truck embodying the features of my invention. While any of the filler blocks herein described could be used on an arch bar truck, in Fig. 8 I have shown the columns 1ª provided with lugs 9 which support fillers 6ᵈ. In this form, when the bolster B is dropped on the spring seat 10, the fillers 6ᵈ instead of sliding down with the bolster fall toward the center of the truck side frame.

One advantage of this invention is that it allows metal bolsters to be substituted for comparatively wide wooden bolsters on old trucks without altering the structure of the side frames. Another very desirable feature is that the removable filler blocks can be used to advantage in connection with types of bolsters and side frames which heretofore caused considerable time and labor to be spent in assembling and dismantling the truck, which they formed part of.

Having thus described the invention, what is claimed as new and desired to be secured by Letters Patent is:

1. In a car truck, side frames having columns, a bolster spaced away from the inner faces of said columns, column guides which coöperate with said columns, said column guides being formed integral with the bolster, and removable fillers interposed between said bolster and columns; substantially as described.

2. In a car truck, side frames having columns, a bolster spaced away from the inner faces of said columns, column guides which coöperate with said columns, said column guides being rigidly secured to the bolster, and removable fillers interposed between said bolster and columns; substantially as described.

3. A car truck having side frames including columns, a bolster provided with column guides which coöperate with said columns, said bolster being spaced away from the inner face of the columns, and removable fillers interposed between said bolster and columns; substantially as described.

4. A car truck having side frames including columns, a bolster provided with column guides which coöperate with said columns, said bolster being spaced away from the inner face of the columns, and removable fillers interposed between said bolster and columns, said fillers being supported by the bolster; substantially as described.

5. In a car truck, side frames having columns, a bolster spaced away from the inner faces of said columns, column guides which coöperate with said columns, said column guides being formed integral with the bolster, and removable fillers loosely mounted between said bolster and columns; substantially as described.

6. A car truck having a side frame including columns and a spring seat, a spring on said spring seat, a bolster mounted on said spring and provided with column guides which coöperate with said columns, said bolster being arranged between said columns and spaced away from the inner faces thereof, and removable fillers interposed between said bolster and columns; substantially as described.

7. In a car truck, side frames having columns and a spring seat, a bolster having pairs of column guides which coöperate with said columns, removable fillers interposed between said bolster and columns, each of said fillers being arranged between a pair of said column guides, and springs interposed between said bolster and spring seat; substantially as described.

In testimony whereof I hereunto affix my signature in the presence of two witnesses, this 31st day of December, 1908.

ALBERT J. McCAULEY.

Witnesses:
GEORGE BAKEWELL,
GEORGE KUBLIN.